No. 672,772. Patented Apr. 23, 1901.
F. A. HOWARD.
HAY FORK.
(Application filed Nov. 23, 1900.)
(No Model.)
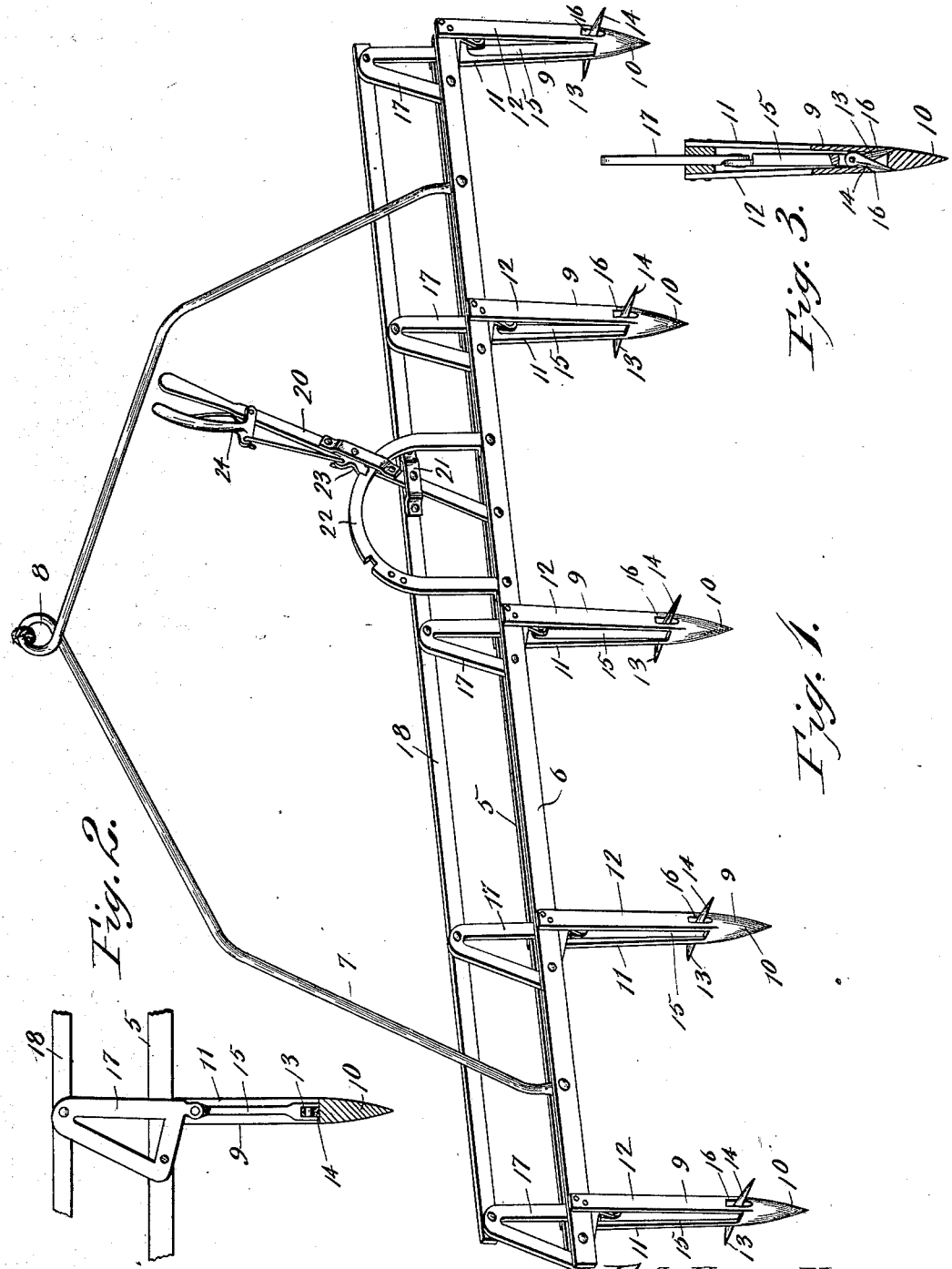
Witnesses
C. H. Walker
Geo. H. Chandler
F. A. Howard, Inventor.
by C. A. Snow & Co.
Attorneys

UNITED STATES PATENT OFFICE.

FRANCIS ALBERT HOWARD, OF VERDELLA, MISSOURI.

HAY-FORK.

SPECIFICATION forming part of Letters Patent No. 672,772, dated April 23, 1901.

Application filed November 23, 1900. Serial No. 37,522. (No model.)

*To all whom it may concern:*

Be it known that I, FRANCIS ALBERT HOWARD, a citizen of the United States, residing at Verdella, in the county of Barton and State of Missouri, have invented a new and useful Hay-Fork, of which the following is a specification.

This invention relates to hay-forks of that class designed for engaging a bale of hay to raise it with a sling, the object of the invention being to provide a simple and efficient device which may be readily forced into a bale of hay or other material and then engaged therewith and which, moreover, may be readily manipulated to permit of withdrawal from the bale at the proper time, further objects and advantages of the invention being evident from the following description.

In the drawings forming a portion of this specification, and in which like numerals of reference indicate similar parts in the several views, Figure 1 is a perspective view showing the complete fork adjusted to its engaging position. Fig. 2 is a section taken vertically through one of the spears and showing the rock-lever and its operating-rod for actuating the barbs. Fig. 3 is a section through the spear at right angles to the section shown in Fig. 2 and showing the parts in position to project the barbs.

Referring now to the drawings, the present fork consists of a frame comprising two spaced bars or rails 5 and 6, between which are disposed the ends of a bail 7, which are riveted to the rails or bars and has an eye 8 at its bight for engagement by a tackle, as will be understood.

Carried by the bars or rails 5 and 6 are spears 9, disposed at intervals along the frame, and which spears each consist of a pointed head portion 10 and a bifurcated stem portion, the bifurcations 11 and 12 extending upwardly and being riveted against the outer faces of the rails 5 and 6 to hold the spears rigidly thereto. The spears lie all in a common plane, so that by engaging their points with a bale and pressing down upon the frame the spears will be caused to sink into the bale for engagement therewith. After the spears have been sunken into the bale in the manner described some means must be provided for preventing withdrawal thereof from the bale, and for this purpose there are employed barbs, (shown at 13 and 14.) The barbs, as illustrated, are disposed with their lower sharpened ends in downwardly-directed passages through the sides of the stem of a spear, and their inner upper ends are pivoted to the lower end of a reciprocatory rod 15, which is disposed within the inclosure of the stem of the spear, and when this reciprocatory rod is pressed downwardly the barbs are forced outwardly through the passages 16 in the sides of the stem of the spear, and as the downward movement of the rod is continued the barbs are forced with their lower sides against the bottom of the slot or bifurcation, so that their outer ends are raised to cause the barbs to finally assume positions at right angles to the spear, or approximately so. When the rod 15 is raised, the barbs are drawn upwardly and, striking against the upper sides of the passages 16, they are folded inwardly and are drawn into the spear, so that there is no projection, and they are in position to pass outwardly when the rod 15 is again moved downwardly.

In order to reciprocate the rod 15, angular levers 17 are pivoted between the rails or bars 5 and 6, these levers being in the form of triangular rockers, each of which is fulcrumed at one base-angle, while the other base-angle is pivoted to the upper end of a rod 15. The upper end of each rocker is pivoted to a connecting-rod or shift-bar 18, so that when this shift-bar is moved longitudinally the rockers are oscillated, with the result that their portions that are connected with rods 15 are moved downwardly and then upwardly to reciprocate the rods 15.

To facilitate the reciprocation of the rod or bar 18 and to hold it at different points of its movement to hold the barbs either projected or withdrawn, a hand-lever 20 is pivoted at its lower end between the bars 5 and 6 and is connected thereabove to the shift rod or bar 18, between said bar and a strap 21 passed over the lever and riveted to the bar. A notched segment 22 is riveted with its ends between the bars 5 and 6, and its notches are disposed for engagement by a common form of pivoted latch 23, mounted upon the lever 20 and having an actuating-rocker 24. It will thus be seen that after the fork has been lowered to engage the spears with a bale and said spears have been forced into the bale if the lever 20 be operated in one direction the barbs of the spears will be projected and will engage in the bale to prevent withdrawal of the spears, so that the bale may be raised through the medium of the tackle connected with the bail of the fork; also, that when the bale has been moved to the proper position reverse movement of the lever 20 will draw the barbs into the spears, permitting the bale to drop from the fork or permitting the fork to be raised from the bale, as occasion may demand, the notched segment and latch being adapted to hold the lever in either of its said positions.

In practice various modifications of the specific construction shown may be made and any suitable materials and proportions may be used for the various parts without departing from the spirit of the invention.

What is claimed is—

A hay-fork comprising laterally-spaced longitudinal bars, spears bifurcated at their upper ends to form arms between which the bars are received and against the inner faces of which they are riveted, said spears having passages therethrough, barbs slidably mounted in the passages for projection therefrom, rockers disposed between the bars to hold them spaced and operably connected with the barbs, said rockers having pivot-pins engaged therewith and with the bars, a shift-rod pivoted to the rockers, a lever pivoted to the bars and lying therebetween, said lever having connection with the shift-rod to operate it, a notched segment having its ends disposed between the bars and riveted thereto, a trigger on the lever for engagement with the segment, and a bail having its ends disposed between and riveted to the bars, whereby the bars are connected at frequent intervals at their inner and outer faces to strengthen the structure.

In testimony that I claim the foregoing as my own I have hereto affixed my signature in the presence of two witnesses.

FRANCIS ALBERT HOWARD.

Witnesses:
   W. H. WATKINS,
   G. L. MINNER.